(12) United States Patent
Yamamoto et al.

(10) Patent No.: US 6,873,668 B2
(45) Date of Patent: Mar. 29, 2005

(54) CLOCK RECOVERY CIRCUIT

(75) Inventors: Takashi Yamamoto, Fukuoka (JP); Kouji Okamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 648 days.

(21) Appl. No.: 09/899,231

(22) Filed: Jul. 6, 2001

(65) Prior Publication Data

US 2002/0003847 A1 Jan. 10, 2002

(30) Foreign Application Priority Data

Jul. 6, 2000 (JP) .................................. 2000-205304

(51) Int. Cl.[7] .............................................. H03D 3/24
(52) U.S. Cl. ..................... 375/373; 375/376; 327/147
(58) Field of Search ............................... 375/373, 376, 375/294, 326, 344; 327/147, 156

(56) References Cited

U.S. PATENT DOCUMENTS 5,937,020 A * 8/1999 Hase et al. .................. 375/376
6,141,163 A 10/2000 Nakamura et al.
6,249,557 B1 * 6/2001 Takatori et al. ............. 375/355
6,630,868 B2 * 10/2003 Perrott et al. ................. 331/17

FOREIGN PATENT DOCUMENTS

| JP | 09-063206 | 3/1997 |
| JP | 09-153262 | 6/1997 |
| JP | 10-256901 | 9/1998 |
| JP | 11-328874 | 11/1999 |

* cited by examiner

Primary Examiner—Temesghen Ghebretinsae
(74) Attorney, Agent, or Firm—McDermott Will & Emery LLP

(57) ABSTRACT

A feed-forward controlled phase difference detector for detecting a phase difference using the output of a comparator included in an analog-to-digital converter, for example, is combined with a known digital feedback controlled phase difference detector for recovering a clock signal. The feed-forward controlled phase difference detector has its loop gain controlled adaptively. By utilizing these two types of phase difference detectors, a clock recovery circuit for recovering a clock signal synchronized to the data read out from a storage medium, for example, can operate faster and more stably.

9 Claims, 4 Drawing Sheets

CLOCK RECOVERY CIRCUIT

BACKGROUND OF THE INVENTION

The present invention relates to a clock recovery circuit for recovering a clock signal synchronized to the data that has been read out from a storage medium, like an optical or magnetic disk, by a digital data read channel.

To recognize an analog signal, read out from a storage medium, as digital data, a digital data read channel needs to recover a clock signal synchronized to the analog read signal. A clock recovery circuit is used for that purpose, i.e., to recover a clock signal from the analog read signal. The clock signal recovered will be used as sampling clock pulses for an analog-to-digital converter (ADC) or system clock pulses for a digital filter or Viterbi decoder.

A known clock recovery circuit recovers a clock signal by establishing single-loop feedback control. Specifically, the known clock recovery circuit receives, as an input signal, either the digital output of an ADC or a digital signal with a waveform shaped by a digital filter. By comparing that input signal to a reference clock signal, the circuit detects a phase difference between them and then controls the oscillation frequency of a voltage-controlled oscillator (VCO) in such a manner as to reduce the phase difference to zero. Then, the clock signal output from the VCO will be fed back as sampling clock pulses to the ADC.

However, if the known clock recovery circuit should cope with data to be transferred at a much higher rate, then the clock signal will be too much delayed by the ADC. The clock signal will also be delayed excessively where the digital filter should perform its filter operation as pipelined processing. That is to say, the clock signal is delayed by the feedback loop too much to acquire a sufficiently great loop gain. For that reason, a frequency lock range realized by the known clock recovery circuit is very narrow and it takes a long time for the known clock recovery circuit to accomplish phase locking completely.

SUMMARY OF THE INVENTION

It is therefore an object of the present invention to provide a clock recovery circuit that realizes a wide enough frequency lock range and that can also accomplish phase locking fast enough.

To achieve this object, the inventive clock recovery circuit includes not just a first clock recovery section for recovering a clock signal by the known digital feedback control but also a second clock recovery section including either analog feed-forward components or feedback components causing a much shorter clock delay. Also, the clock recovery circuit of the present invention is so constructed as to adaptively control the loop gain of the second clock recovery section.

DETAILED DESCRIPTION OF THE INVENTION

Figure 1:
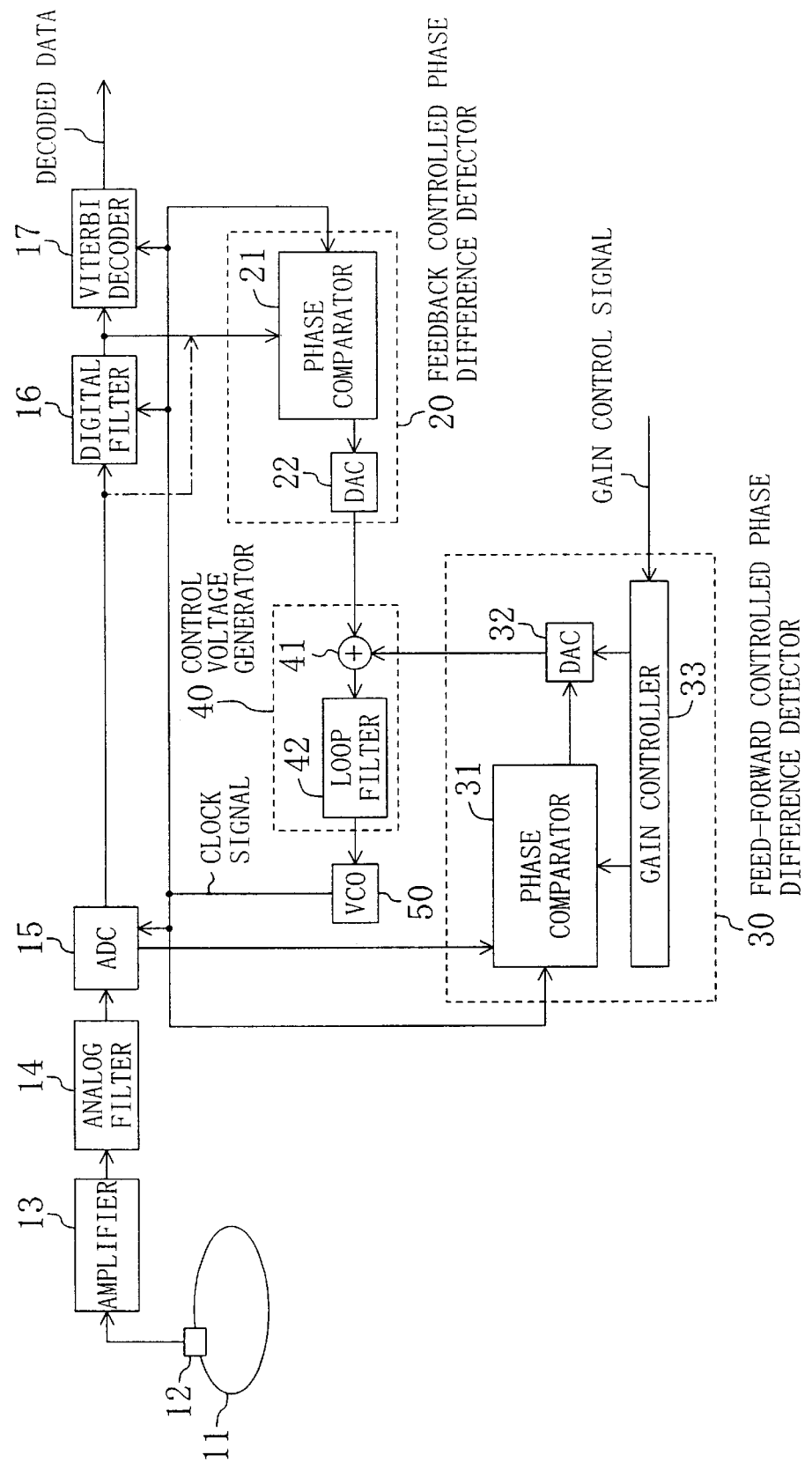
FIG. 1 is a block diagram illustrating an exemplary configuration for a clock recovery circuit according to the present invention.

FIG. 1 illustrates an exemplary configuration for a clock recovery circuit according to the present invention. As shown in FIG. 1, the circuit is used for recovering a clock signal, synchronized to the data stored on a storage medium 11, from an analog signal that has been read out by a read head 12 from the storage medium 11. The circuit includes amplifier 13, analog filter 14, ADC 15, digital filter 16, Viterbi decoder 17, feedback and feed-forward controlled phase difference detectors 20 and 30, control voltage generator 40 and VCO 50. The amplifier 13 corrects the amplitude of the analog read signal. The digital filter 16 shapes the waveform of a digital signal that has been output from the ADC 15. The feedback and feed-forward controlled phase difference detectors 20 and 30 will also be herein called the first and second phase difference detectors, respectively. Specifically, the first phase difference detector 20 detects a phase difference between the output of the digital filter 16 and a reference clock signal output from the VCO 50. On the other hand, the second phase difference detector 30 detects a phase difference between the output of a comparator (not shown) included in the ADC 15 and the reference clock signal.

As shown in FIG. 1, the first phase difference detector 20 includes phase comparator 21 and digital-to-analog converter (DAC) 22. The phase comparator 21 detects and outputs the phase difference between the output of the digital filter 16 and the reference clock signal. The DAC 22 converts the digital quantity (i.e., the output of the phase comparator 21) into an analog quantity. The second phase difference detector 30 includes phase comparator 31, DAC 32 and gain controller 33. The phase comparator 31 detects the phase difference between the output of the comparator included in the ADC 15 and the reference clock signal. The DAC 32 converts the digital quantity (i.e., the output of the phase comparator 31) into an analog quantity. The gain controller 33 controls the gain of the phase comparator 31 in response to a gain control signal externally input. The phase difference may be detected by finding a point in time when the read signal goes to zero and then obtaining a value sampled at that time as the phase difference, for example. The control voltage generator 40 includes adder 41 and loop filter 42 as a smoothing circuit. In this clock recovery loop, the reference clock signal, or the output of the VCO 50, has its phase shifted in such a manner as to reduce the phase difference to zero.

In the clock recovery circuit shown in FIG. 1, first, the read head 12 converts the digital data, which has been stored on the storage medium 11, into an analog read signal. Next, the analog read signal has its amplitude corrected by the amplifier 13. Then, the amplitude-corrected analog signal has its high frequency components (to be noise) removed, and has its waveform equalized, by the analog filter 14. Specifically, the waveform of the analog signal is adjusted in accordance with the characteristics of the Viterbi decoder 17. After having been subjected to these types of processing, the analog signal is input to the ADC 15. In response, the ADC 15 samples the output of the analog filter 14 synchronously with the clock signal supplied from the VCO 50, converts the analog signal into its digital version and then outputs the digital signal. Next, the digital signal, output from the ADC 15, has its waveform shaped by the digital filter 16. And then the waveform-shaped digital signal is subjected to a most likelihood decoding process by the Viterbi decoder 17.

To obtain a clock signal synchronized to the read signal while decoding the data, a control voltage is determined for the VCO 50 using the two types of phase differences that have been detected as a result of feedback and feed-forward control operations. That is to say, the clock recovery circuit shown in FIG. 1 is characterized by including a feed-forward loop in addition to the normal feedback loop and by controlling the gain of the feed-forward loop adaptively. In this circuit, the first and second phase difference detectors 20 and 30 detect first and second phase differences in accordance with the output of the digital filter 16 and the output of the comparator included in the ADC 15, respectively. The second phase difference, derived from the output of the internal comparator of the ADC 15, can be used to reduce the clock delay caused by the ADC 15 itself, thus contributing to boosting the gain of the clock recovery loop. However, this phase difference detection is not so accurate, because the data used for this detection is yet to have its waveform shaped by the digital filter 16. On the other hand, the first phase difference, detected by using the output of the digital filter 16, causes a longer clock delay than the second phase difference detected by using the output of the internal comparator of the ADC 15. Specifically, the additional clock delay caused is equivalent to the number of clock cycles required for the digital filter 16 to perform the filter operation. For that reason, the feedback loop should have its gain reduced. However, this digital data has already had its waveform shaped by the digital filter 16, i.e., has already been subjected to correction operations for removing waveform interference components or noise components. Accordingly, the output of the digital filter 16 is much more accurate than that of the internal comparator of the ADC 15.

Thus, when the read head 12 starts to read out data from the storage medium 11, the clock recovery circuit shown in FIG. 1 starts to operate these two loops simultaneously. At this early stage, the feed-forward loop should be controlled to acquire a gain much greater than that of the feedback loop. That is to say, a rough locking operation is performed first. Next, after a certain amount of time has passed, the feed-forward loop will have to be controlled to reduce its gain to less than that of the feedback loop.

As described above, the clock recovery circuit includes feedback and feed-forward loops and adaptively controls the gain of the feed-forward loop, thereby realizing much more accurate and faster phase locking. It should be noted that as indicated by the one-dot chain in FIG. 1, the output of the ADC 15, not the output of the digital filter 16, may be input to the feedback controlled phase difference detector 20.

Figure 2:
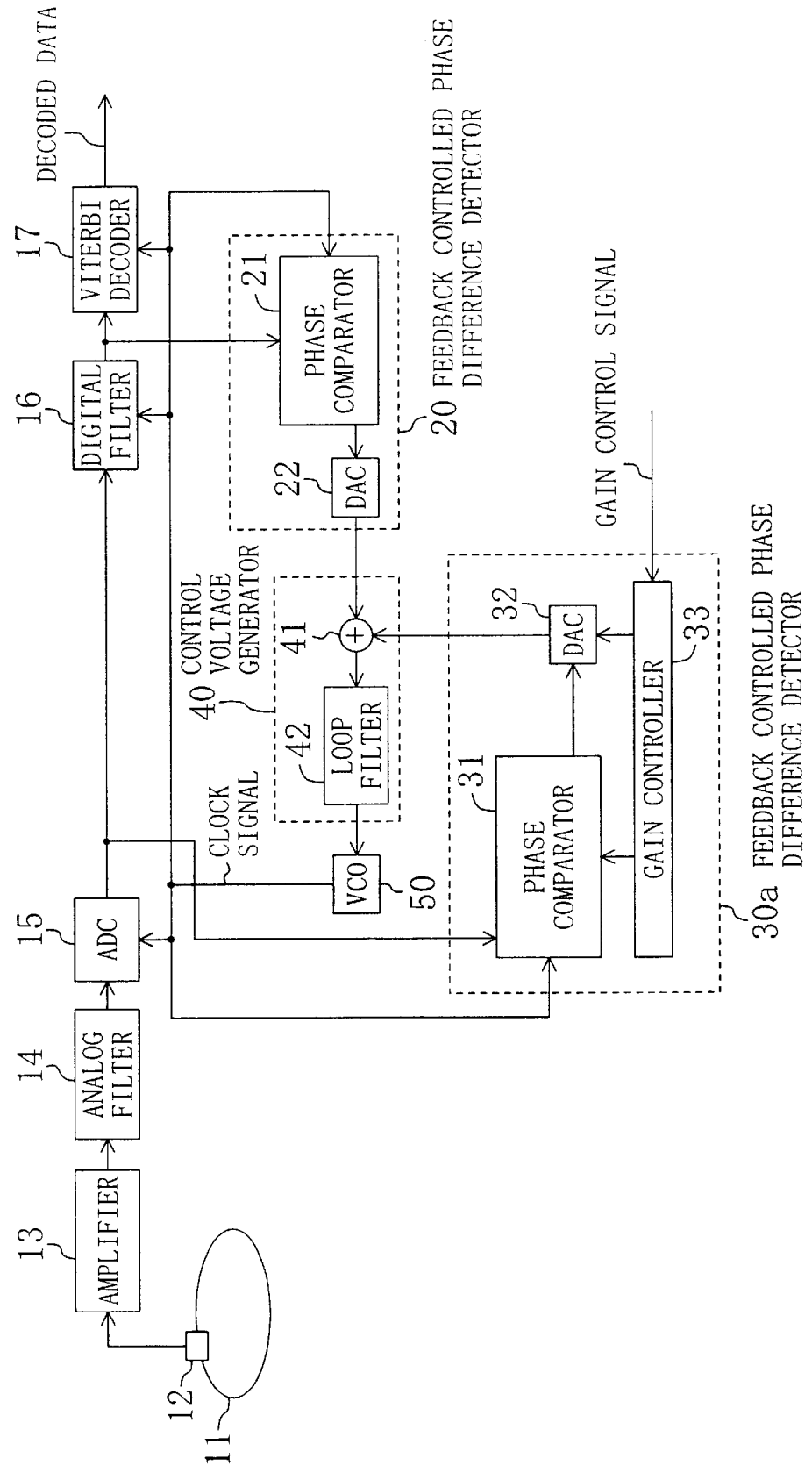
FIG. 2 is a block diagram illustrating another exemplary configuration for the inventive clock recovery circuit.

FIG. 2 illustrates another exemplary configuration for the inventive clock recovery circuit. This circuit includes not only the feedback controlled phase difference detector (i.e., first phase difference detector) 20 for detecting a phase difference using the output of the digital filter 16 but also another feedback controlled phase difference detector 30a. The feedback controlled phase difference detector 30a (i.e., second phase difference detector) detects a phase difference using the output of the ADC 15. The output of the ADC 15 causes a shorter clock delay than that of the digital filter 16. In the other respects, the circuit shown in FIG. 2 is the same as the counterpart shown in FIG. 1, and the detailed description thereof will be omitted herein.

The clock recovery circuit shown in FIG. 2 is characterized by including not just the first feedback loop for detecting a first phase difference using the output of the digital filter 16 but also a second feedback loop for detecting a second phase difference using the output of the ADC 15. The circuit is also characterized by controlling the gain of the second feedback loop adaptively. The second phase difference, derived from the output of the ADC 15, can be used to reduce the clock delay caused by the ADC 15 itself, thus contributing to boosting the gain of the clock recovery loop. However, this phase difference detection is not so accurate, because the data used for this detection is yet to have its waveform shaped by the digital filter 16. On the other hand, the first phase difference, detected by using the output of the digital filter 16, causes a longer clock delay than the second phase difference detected by using the output of the ADC 15. Specifically, the additional clock delay caused is equivalent to the number of clock cycles required for the digital filter 16 to perform the filter operation. For that reason, the first feedback loop should have its gain reduced. However, this digital data has already had its waveform shaped by the digital filter 16, i.e., has already been subjected to correction operations for removing waveform interference components or noise components. Accordingly, the output of the digital filter 16 is much more accurate than that of the ADC 15.

Thus, when the read head 12 starts to read out data from the storage medium 11, the clock recovery circuit shown in FIG. 2 starts to operate these two feedback loops simultaneously. At this early stage, the second loop should be controlled to acquire a gain much greater than that of the first loop. That is to say, a rough locking operation is performed first. Next, after a certain amount of time has passed, the second loop will have to be controlled to reduce its gain to less than that of the first loop.

As described above, the clock recovery circuit includes first and second feedback loops for detecting first and second phase differences using the output of the digital filter 16 and the output of the ADC 15, respectively, and adaptively controls the gain of the second feedback loop. Thus, the circuit realizes much more accurate and faster phase locking.

Figure 3:
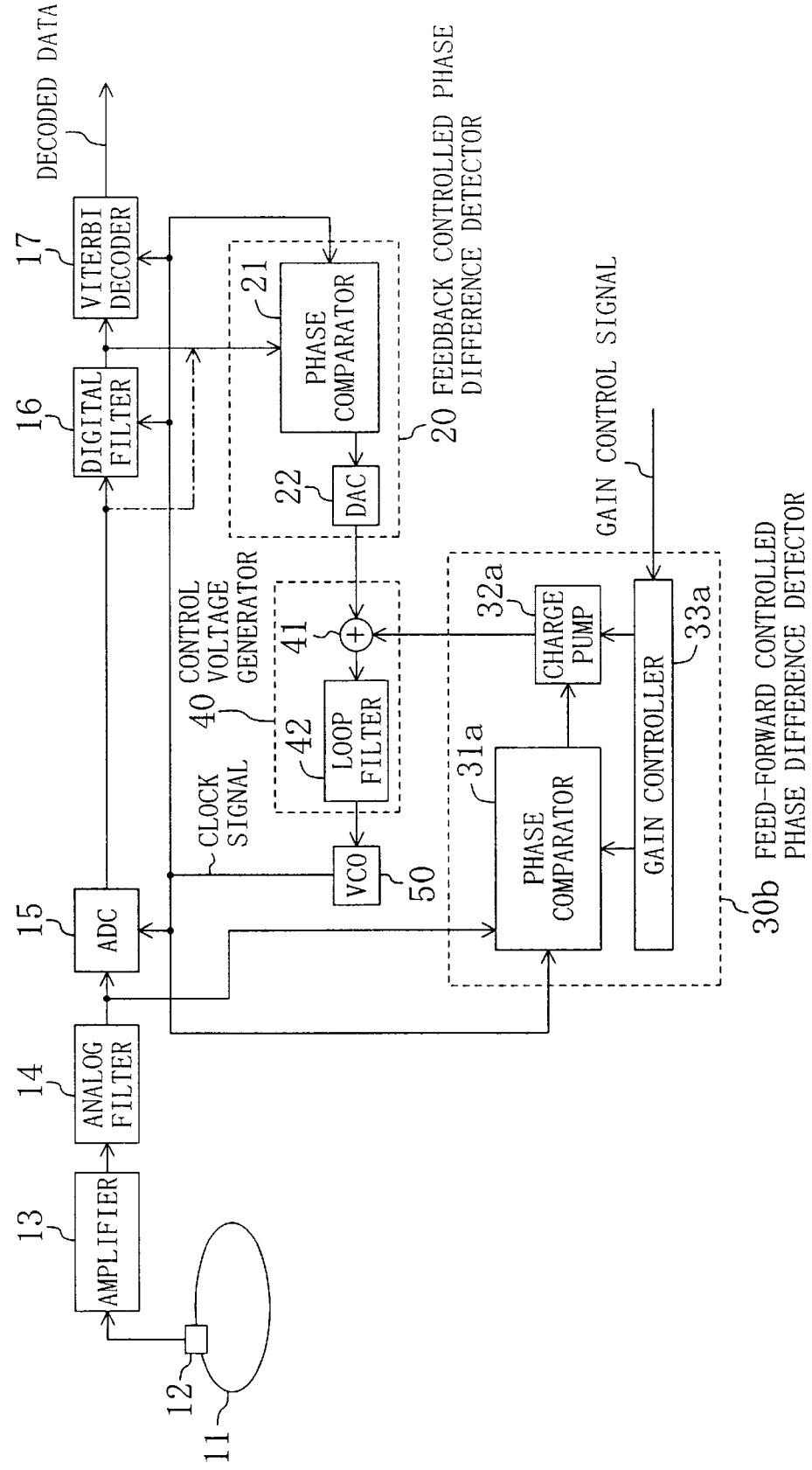
FIG. 3 is a block diagram illustrating still another exemplary configuration for the inventive clock recovery circuit.

FIG. 3 illustrates still another exemplary configuration for the inventive clock recovery circuit. As shown in FIG. 3, the circuit includes not only the feedback controlled phase difference detector (i.e., first phase difference detector) 20 for detecting a first phase difference using the output of the digital filter 16 but also a feed-forward controlled phase difference detector (i.e., second phase difference detector) 30b. The feed-forward controlled phase difference detector 30b detects a second phase difference using the output of the analog filter 14. The second phase difference detector 30b includes phase comparator 31a, charge pump 32a and gain controller 33a. The phase comparator 31a receives the output of the analog filter 14 and detects a phase difference as an analog quantity. The charge pump 32a outputs a current in an amount variable with the output of the phase comparator 31a. The gain controller 33a controls the gain of the phase comparator 31a in response to a gain control signal externally input. In the other respects, the clock recovery circuit shown in FIG. 3 is the same as the counterpart shown in FIG. 1, and the detailed description thereof will be omitted herein.

The clock recovery circuit shown in FIG. 3 is characterized by including a feed-forward loop for detecting the second phase difference using the output of the analog filter 14 in addition to the normal feedback loop for detecting the first phase difference using the output of the digital filter 16. This circuit is also characterized by controlling the gain of the feed-forward loop adaptively. The second phase difference, derived from the output of the analog filter 14, can be used to reduce the digital clock delay, thus contributing to boosting the gain of the clock recovery loop. This is because the second phase difference is computed as an analog quantity. However, this phase difference detection is not so accurate, because the data used for this detection is yet to have its waveform shaped by the digital filter 16. On the other hand, the first phase difference, detected by using the output of the digital filter 16, causes a longer clock delay than the second phase difference detected by using the output of the analog filter 14. Specifically, the additional clock delay caused is equivalent to the number of clock cycles required for the digital filter 16 to perform the filter operation. For that reason, the feedback loop should have its gain reduced. However, this digital data has already had its waveform shaped by the digital filter 16, i.e., has already been subjected to correction operations for removing waveform interference components or noise components. Accordingly, the output of the digital filter 16 is much more accurate than that of the analog filter 14.

Thus, when the read head 12 starts to read out data from the storage medium 11, the clock recovery circuit shown in FIG. 3 starts to operate these two loops simultaneously. At this early stage, the feed-forward loop should be controlled to acquire a gain much greater than that of the feedback loop. That is to say, a rough locking operation is performed first. Next, after a certain amount of time has passed, the feed-forward loop will have to be controlled to reduce its gain to less than that of the feedback loop.

As described above, the clock recovery circuit includes feedback and feed-forward loops using the output of the digital filter 16 and the output of the analog filter 14, respectively, and adaptively controls the gain of the feed-forward loop, thereby realizing much more accurate and faster phase locking. It should be noted that as indicated by the one-dot chain in FIG. 3, the output of the ADC 15, not the output of the digital filter 16, may be input to the feedback controlled phase difference detector 20.

Figure 4:
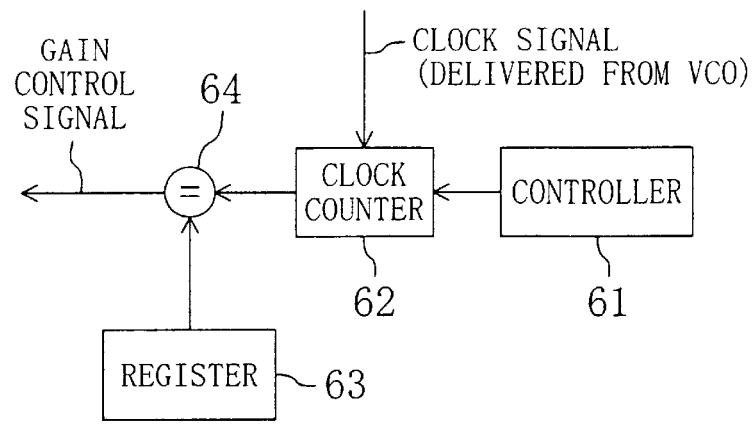
FIG. 4 is a block diagram illustrating an exemplary combination of components for generating a gain control signal for the clock recovery circuit shown in FIG. 1, 2 or 3.

FIG. 4 illustrates how the gain control signal may be generated for the circuit shown in FIG. 1, 2 or 3. In the example shown in FIG. 4, a controller 61 controls reading data from the storage medium 11 and supplies a read start signal to a clock counter 62. In response to the read start signal, the counter 62 starts to count the number of clock pulses delivered from the VCO 50. When a comparator 64 finds the count equal to the value that the user preset on a register 63, the gain control signal is changed from logical zero (i.e., LOW) to logical one (i.e., HI) state so that the second phase difference detector 30, 30a or 30b has its gain reduced.

Figure 5:
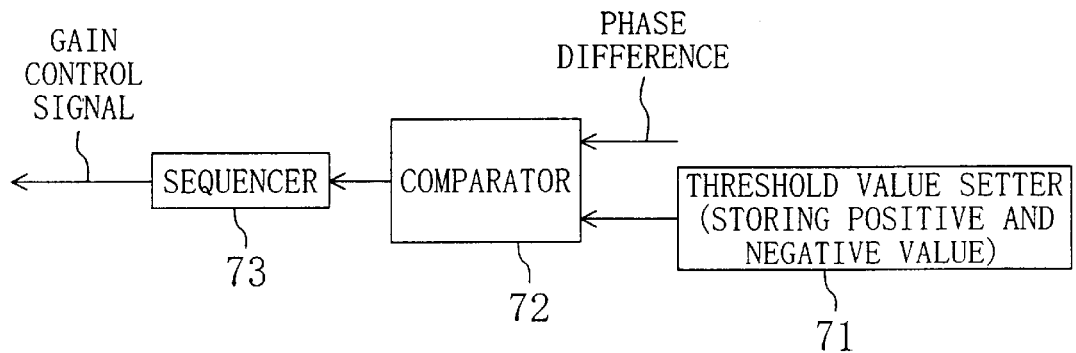
FIG. 5 is a block diagram illustrating another exemplary combination of components for generating the gain control signal for the clock recovery circuit shown in FIG. 1, 2 or 3.

FIG. 5 illustrates how the gain control signal may also be generated for the circuit shown in FIG. 1, 2 or 3. In the example shown in FIG. 5, positive and negative threshold values, which were preset by the user, are stored on a threshold value setter 71. A comparator 72 compares the phase difference that has been detected by the second phase difference detector 30, 30a or 30b with the threshold values stored on the threshold value setter 71. If the comparator 72 finds the phase difference falling within the range defined by these threshold values, then the comparator 72 outputs a HI signal. Receiving the output signal of the comparator 72, a sequencer 73 counts the number of clock cycles corresponding to the interval in which the output signal is HI. And when the number reaches a predetermined value, the sequencer 73 outputs a HI signal. In the example shown in FIG. 5, when the rough locking operation is completed, i.e., when the phase difference detected by the second phase difference detector 30, 30a or 30b enters a steady state, the gain control signal is changed from LOW to HI to reduce the gain of the second phase difference detector 30, 30a or 30b.

What is claimed is:

1. A clock recovery circuit for recovering a clock signal, synchronized to data stored on a storage medium, from an analog signal that has been read out from the storage medium, the circuit comprising:

amplifying means, which corrects the amplitude of the analog signal read out from the storage medium and then outputs an amplitude-corrected analog signal;

an analog filter, which receives the amplitude-corrected analog signal from the amplifying means, equalizes the waveform of the amplitude-corrected analog signal and then outputs a waveform-equalized analog signal;

sampling means, which samples the waveform-equalized analog signal output from the analog filter by reference to the clock signal, converts the sampled analog signal into a digital signal and then outputs the digital signal;

waveform shaping means, which receives the digital signal from the sampling means, shapes the waveform of the digital signal by reference to the clock signal and then outputs a waveform-shaped digital signal;

first phase difference detecting means, which receives the digital signal from the sampling means and/or the waveform-shaped digital signal from the waveform shaping means, detects a first phase difference between the digital signal received and the clock signal, and then outputs the first phase difference;

second phase difference detecting means, which receives the output of a comparator included in the sampling means, detects a second phase difference between the output of the comparator and the clock signal and then outputs the second phase difference;

control signal generating means, which generates and outputs a frequency control signal in accordance with the first and second phase differences; and oscillating means, which controls the frequency of the clock signal in accordance with the frequency control signal output from the control signal generating means and then outputs the clock signal with the controlled frequency, wherein the second phase difference detecting means has its gain controlled in response to a gain control signal.

2. The circuit of claim 1, wherein the gain control signal is applied in such a manner as to reduce the gain of the second phase difference detecting means when a predetermined time has passed since the data started to be read out from the storage medium.

3. The circuit of claim 1, wherein the gain control signal is applied in such a manner as to reduce the gain of the second phase difference detecting means when the second phase difference, detected by the second phase difference detecting means, enters a steady state.

4. A clock recovery circuit for recovering a clock signal, synchronized to data stored on a storage medium, from an analog signal that has been read out from the storage medium, the circuit comprising:

amplifying means, which corrects the amplitude of the analog signal read out from the storage medium and then outputs an amplitude-corrected analog signal;

an analog filter, which receives the amplitude-corrected analog signal from the amplifying means, equalizes the waveform of the amplitude-corrected analog signal and then outputs a waveform-equalized analog signal;

sampling means, which samples the waveform-equalized analog signal output from the analog filter by reference to the clock signal, converts the sampled analog signal into a digital signal and then outputs the digital signal;

waveform shaping means, which receives the digital signal from the sampling means, shapes the waveform of the digital signal by reference to the clock signal and then outputs a waveform-shaped digital signal;

first phase difference detecting means, which receives the waveform-shaped digital signal from the waveform shaping means, detects a first phase difference between the digital signal received and the clock signal, and then outputs the first phase difference;

second phase difference detecting means, which receives the digital signal from the sampling means, detects a second phase difference between the digital signal and the clock signal and then outputs the second phase difference;

control signal generating means, which generates and outputs a frequency control signal in accordance with the first and second phase differences; and oscillating means, which controls the frequency of the clock signal in accordance with the frequency control signal output from the control signal generating means and then outputs the clock signal with the controlled frequency, wherein the second phase difference detecting means has its gain controlled in response to a gain control signal.

5. The circuit of claim 4, wherein the gain control signal is applied in such a manner as to reduce the gain of the second phase difference detecting means when a predetermined time has passed since the data started to be read out from the storage medium.

6. The circuit of claim 4, wherein the gain control signal is applied in such a manner as to reduce the gain of the second phase difference detecting means when the second phase difference, detected by the second phase difference detecting means, enters a steady state.

7. A clock recovery circuit for recovering a clock signal, synchronized to data stored on a storage medium, from an analog signal that has been read out from the storage medium, the circuit comprising:

amplifying means, which corrects the amplitude of the analog signal read out from the storage medium and then outputs an amplitude-corrected analog signal;

an analog filter, which receives the amplitude-corrected analog signal from the amplifying means, equalizes the waveform of the amplitude-corrected analog signal and then outputs a waveform-equalized analog signal;

sampling means, which samples the waveform-equalized analog signal output from the analog filter by reference to the clock signal, converts the sampled analog signal into a digital signal and then outputs the digital signal;

waveform shaping means, which receives the digital signal from the sampling means, shapes the waveform of the digital signal by reference to the clock signal and then outputs a waveform-shaped digital signal;

first phase difference detecting means, which receives the digital signal from the sampling means and/or the waveform-shaped digital signal from the waveform shaping means, detects a first phase difference between the digital signal received and the clock signal, and then outputs the first phase difference;

second phase difference detecting means, which receives the waveform-equalized analog signal from the analog filter, detects a second phase difference between the waveform-equalized analog signal and the clock signal and then outputs the second phase difference;

control signal generating means, which generates and outputs a frequency control signal in accordance with the first and second phase differences; and oscillating means, which controls the frequency of the clock signal in accordance with the frequency control signal output from the control signal generating means and then outputs the clock signal with the controlled frequency, wherein the second phase difference detecting means has its gain controlled in response to a gain control signal.

8. The circuit of claim 7, wherein the gain control signal is applied in such a manner as to reduce the gain of the second phase difference detecting means when a predetermined time has passed since the data started to be read out from the storage medium.

9. The circuit of claim 7, wherein the gain control signal is applied in such a manner as to reduce the gain of the second phase difference detecting means when the second phase difference, detected by the second phase difference detecting means, enters a steady state.

* * * * *